United States Patent [19]

Su

[11] Patent Number: 5,755,153
[45] Date of Patent: May 26, 1998

[54] MEAT ROASTING DEVICE

[75] Inventor: Chao-Ta Su, Hsin Chu Hsien, Taiwan

[73] Assignee: Ron Rong Technology Co., Ltd., Hsin Chy Hsien, Taiwan

[21] Appl. No.: 752,519

[22] Filed: Nov. 20, 1996

[51] Int. Cl.[6] .................................................. A47J 37/08
[52] U.S. Cl. ................... 99/395; 99/397; 99/421 H; 99/426
[58] Field of Search .................... 99/395, 397, 421 R, 99/421 H, 349, 351, 393, 419, 426; 126/25 R

[56] References Cited

U.S. PATENT DOCUMENTS

| | | | |
|---|---|---|---|
| 1,134,343 | 4/1915 | Mago | 99/397 |
| 1,794,870 | 3/1931 | Serrell | 99/426 X |
| 2,576,028 | 11/1951 | Mitchell | 99/397 |
| 4,944,282 | 7/1990 | Agular et al. | 99/395 X |
| 4,985,607 | 1/1991 | Oya | 99/421 H X |
| 5,536,518 | 7/1996 | Rummel | 99/421 H X |

*Primary Examiner*—Reginald L. Alexander
*Attorney, Agent, or Firm*—Bacon & Thomas

[57] ABSTRACT

A meat roasting device having an automatically rotated barbecue grill mainly comprising: a furnace frame, a barbecue grill, and a driving device, wherein said driving device is fixed on the support plate of the furnace frame, and is engageable with a barbecue grill having an elastic clamping force by a driving bushing. When the driving device rotates, the barbecue grill may be driven to rotate by the driving bushing in the furnace frame.

2 Claims, 8 Drawing Sheets

MEAT ROASTING DEVICE

FIELD OF THE INVENTION

The present invention is related to a meat roasting device, especially, to a meat roasting device having an automatically rotated barbecue grill.

DESCRIPTION OF THE PRIOR ART

Nowadays, commercial meat roasting devices generally comprise a furnace frame and a barbecue grill. The usual combination of the two components is the barbecue grill may be fixed to the furnace frame, or the barbecue grill placed on the furnace frame may be manually rotated, but in all such kinds of combinations thereof, the user must manually operate said devices to some extent during roasting. For example, when the flame within the furnace frame is too high or too low, the user must adjust the barbecue to a proper height or turn the roasting object placed on the barbecue grill, or the user must manually and continually rotate a barbecue spit placed on the grill at an unsteady-speed. In said roasting operation, if the user is not skilled in roasting technology, the roasting object often is not well-cooked, which poses some potential danger to the person who eats the inadequately cooked meat.

In general the barbecue grill is constructed of two fixed iron frames to sandwich the object to be roasted and the plane which is defined by the barbecue grill is generally formed as a lattice. However, in the prior barbecue grill a hard iron frame was used to clamp the roasting object to the grill, thus it was most suitable for thin, sliced roasting objects. However, the thickness of roasting objects such as sausage, fish or other thick meats will affect the clamping condition of the barbecue grill, thus, the rotating operation can not be performed.

An object of the present invention is to provide a meat roasting device which has an automatically rotated barbecue grill, wherein the roasted object will be turned at a fixed speed.

A further object of the present invention is to provide a meat roasting device having an automatically rotated barbecue grill, wherein the barbecue grill can effectively clamp the roasting object to the grill regardless of the its thickness.

BRIEF DESCRIPTION OF THE DRAWINGS

The present invention will become more apparent from the following detailed description when read in connection with the accompanying drawing.

BRIEF DESCRIPTION OF THE PREFERRED EMBODIMENTS

Figure 1:
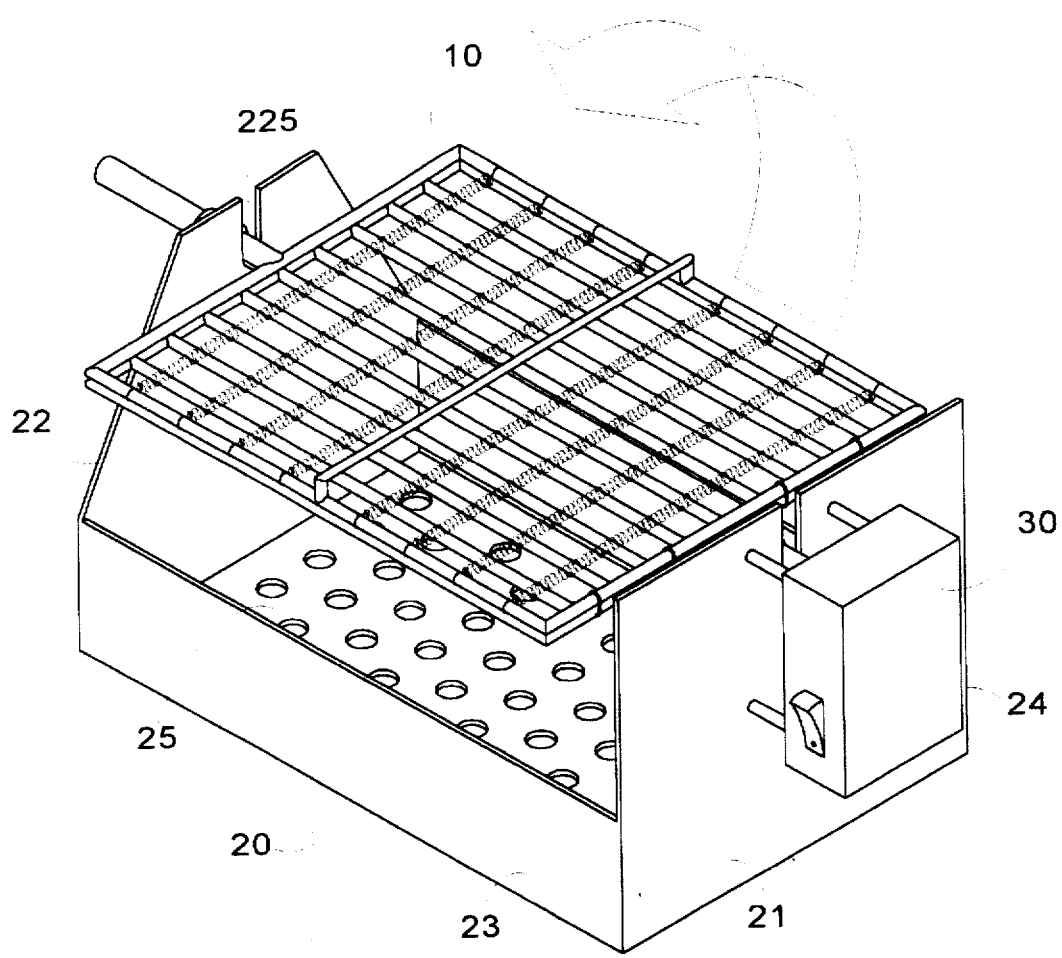
FIG. 1 is a perspective view of the present invention.

FIG. 1 shows the perspective view of the combination of the furnace frame 20 and barbecue grill 10. When roasting meat, the barbecue grill 10 is driven by a driving device 30 so to rotate it in the furnace frame 20 along the direction of the arrow shown in the figure or an inverse direction thereof After clamping the barbecue grill 10, the lattice area thereof is within the flame roasting area of the furnace frame 20 during rotating so that the roasting object on the barbecue grill 10 is roasted uniformly. Besides, a plurality of springs on the barbecue grill provide elastic clamps for clamping the roasting object so as to assure that the roasting object is steadily held on the lattice area. The furnace frame 20 consists of support plates 21, 22, lateral plates 23, 24 and bottom plate 25, and the open space formed by support plates 21, 22, lateral plates 23, 24 and bottom plate 25 limits the range of the internal flame of the furnace frame 20. A plurality of draft holes disposed on the bottom plate 25 is used to place the fuel source, such as coal.

Figure 2:
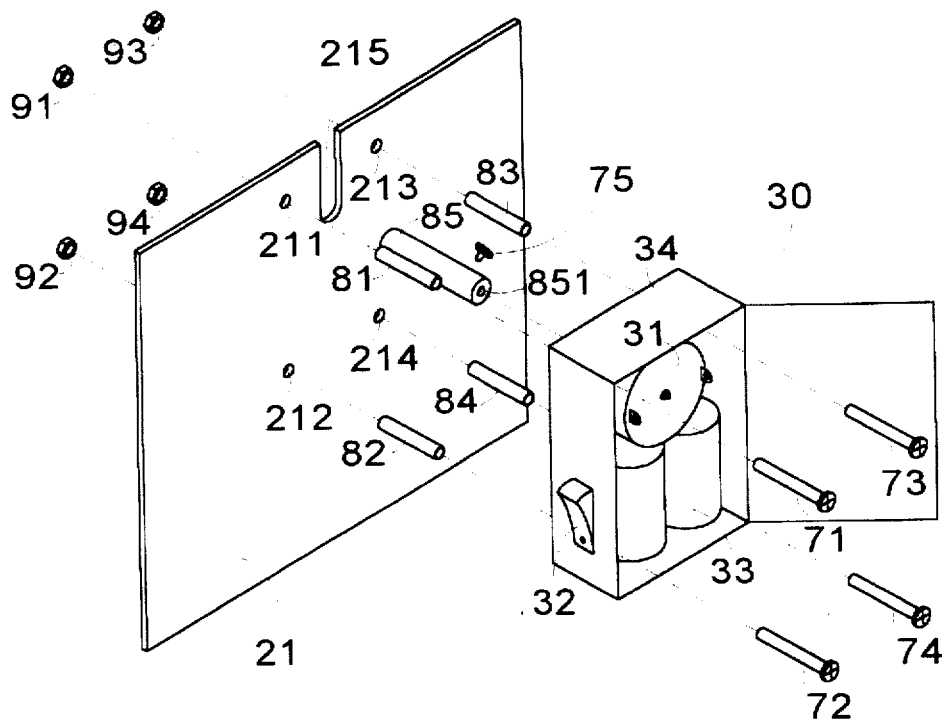
FIG. 2 is an exploded perspective view of the driving device and furnace frame of the present invention.
Figure 3:
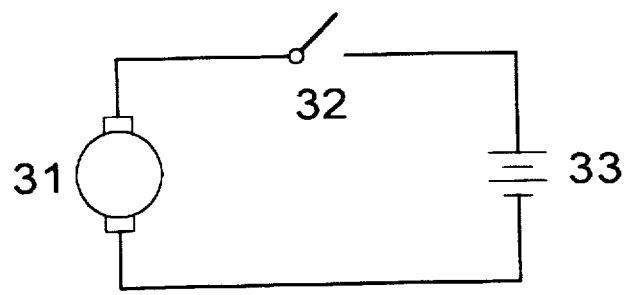
FIG. 3 shows an equivalent circuit of the electrical connection of the driving device of the present invention.

Now referring to FIG. 2, the driving device 30 comprises a DC motor 31, a switch 32, a battery 33, and a housing 34. Said DC motor 31 is the rotating force source of the barbecue grill 10 of the present invention, and the battery 33 is the power source of said DC motor 31. FIG. 3 shows the equivalent circuit of the electrical connection of the driving device 30. A single Kirchhoff voltage loop (KVL) is formed by a DC motor 31, switch 32 and battery 33. The "ON" and "OFF" operations of the switch 32 directly control whether the DC motor 31 is working or not. Moreover, the DC motor 31 is fixed on the inside of the housing 34 by gluing or by other means of engaging. The switch 32 is disposed on the outside of the housing 34 so that the user can easily control the switch directly, and the replaceable battery 33 is located within the housing 34.

Referring now to FIG. 2 again, it shows the exploded perspective view of the driving device 30 and the furnace frame 10. The housing 34 of the driving device 30 is fixed on the support plate 21 of the furnace frame 20 by means of screws 71, 72, 73, 74 penetrating the housing 34 along the respective center lines of through holes 211, 212, 213, 214 on the support plate 21. Said screws 71, 72, 73, 74 lock with the nuts 91, 92, 93, 94 at the bottom of housing 34 to face the support plate 21, respective bushings 81, 82, 83, 84, and respective through holes 211, 212, 213, 214 of the support plate 21. The four bushings 81, 82, 83, 84 are located between the support plate 21 and the driving device 31, and all have the same length and hardness so that they are sufficient to support the weight of the driving device 30 and provide an heat isolation to isolate the support plate 21 from the driving device 30.

The rotary axle of said DC motor 31 of the driving device 30 also penetrates the housing 34 and is inserted into a hole 851 on one end of a driving bushing 85. The rotary axle of said DC motor 31 may be engageable with the hole 851 by gluing or tightly pressing, or by using a positioning screw 75 to lock along the lateral wall of driving bushing 85 so as to locate the rotary axle. Thus when the DC motor is rotated, the driving bushing 85 is driven to rotate along the rotation direction of the rotary axle. The length of the driving bushing 85 will cause it to enter the inside of the furnace frame 20 after the driving device 30 and support plate 21 are combined. The support plate 21 of the furnace frame 20 has a U-shaped notch 215 for providing the path and the supporting point of the driving bushing 85 through said support plate 21. The width of said U-shaped notch 215 is slightly larger than the external diameter of the driving bushing 85, and the longitudinal depth of said U-shaped notch is just provided as the supporting point of the driving bushing 85 and is used to sustain the central line of the driving bushing 85 and the central line of the DC motor 31 to align along a line.

Figure 4A:
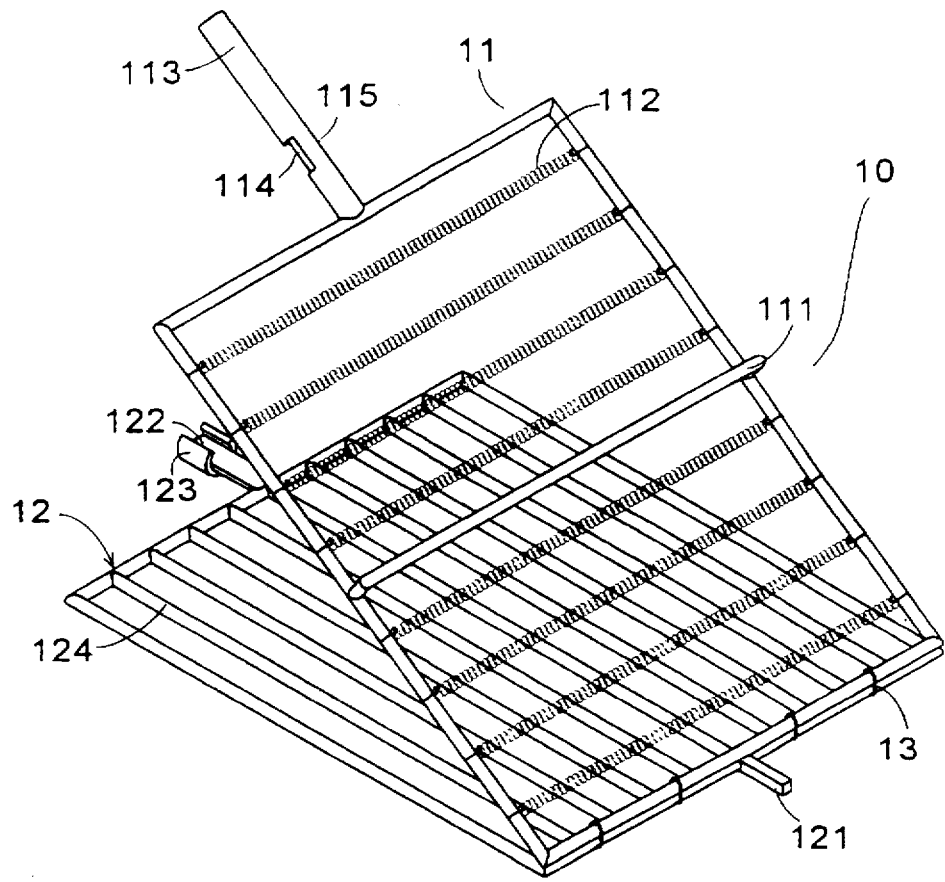
FIG. 4A is a perspective view of the barbecue grill of the present invention in an open state.

FIG. 4A shows the perspective view of a barbecue grill in the present invention before being clamped. The barbecue grill 10 according to the embodiment of the present invention comprises a holding frame 12 and an elastic frame 11. after the holding frame 12 and the elastic frame 11 are clamped, an elastic clamping range having a lattice shape is formed. The holding frame 12 comprises a plurality of parallel iron strips 124 with equal spaces. A rectangular tenon 121 is located on one side of the holding frame 12 for engagement with a bushing bush 85 with respect to one end of the rotary axle of the DC motor 31, and a receiving support 122 with a rotary buckle 123 arranged on another side with respect to the rectangular tenon 121 is presented as a hemicylindrical shape. An elastic frame 11 comprises a plurality of parallel springs 112 to be perpendicular to iron strips 124 of holding frame 12 and to form an elastic plane. One side of the elastic frame 11 and one side of the holding frame 12 having tenon 121 are loosely wound together with a plurality of iron wires 13 so that an extended angle is formed by the adjoining side of the elastic frame 11 and the holding frame 12 as a pivotal axle. Thus, the elastic frame 11 is arranged with a handle 113 on the other side with respect to the side as a pivotal axle. The distal end of said handle with respect to the elastic frame 11 is shaped as a cylinder in order to hold the handle, and the other end of said handle near the elastic frame 12 is shaped as a hemicylinder, the surface of the hemicylinder corresponds to the surface of the receiving support 122 of holding frame 12 and handle 113 and the receiving support 122 are combined as a cylinder. One hemicylindrical portion of said handle 113 has a pair of symmetrical cuts 114, 115 which are positioned such that after the handle 113 and the receiving support 122 are combined, they corresponds to the opening of the flexible buckle 123. Therefore, the cuts 114, 115 make a portion of the handle 113 being smaller than the diameter of cylinder so that during the combining process, the handle 113 can pass through the opening of the flexible buckle 123 easily. Furthermore, since the elastic frame 11 includes a plurality of springs 112, the two sides buckled by the springs 112 will receive the inward elastic stress from the springs. In order to prevent the deformation of the frame 11 induced by the inward elastic stress, a support girder 111 is arranged between the two sides thereof against the elastic stress.

Further referring to FIG. 1, the support plate 21 of the furnace frame 20 is rectangular, which is different from the support plate with a trapezium shape in order that the uncovered elastic frame 11 may remain on the top of the support plate 21 when the holding frame 12 of the barbecue grill 10 within the furnace frame 20 is in the horizontal state. Thus, the user may conveniently pick up the roasting object on the holding frame 12.

Figure 4B:
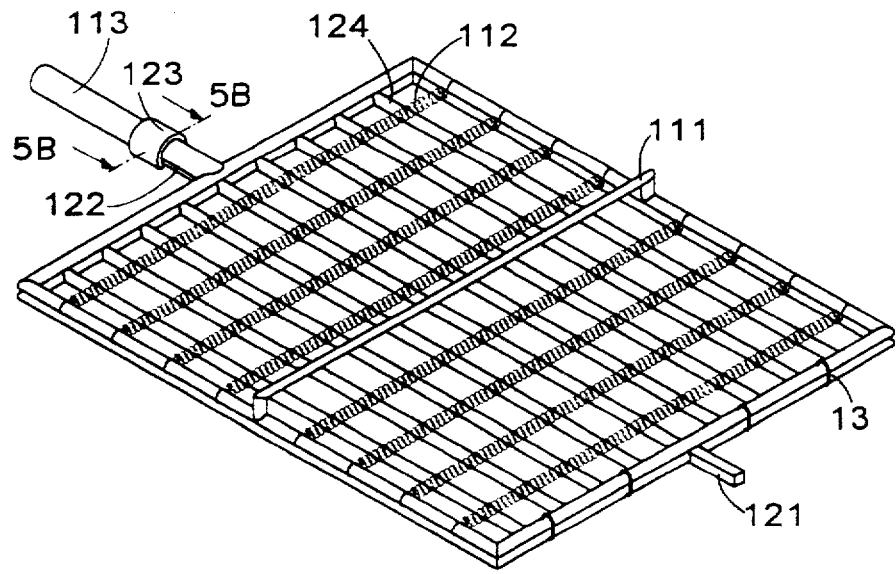
FIG. 4B is a perspective view of the barbecue grill of the present invention in a clamping state.

Referring to FIG. 4B, it shows the perspective view of the barbecue grill 10 of the present invention in a clamped state, wherein the flexible buckle 123 is rotated to a buckling position after the handle 112 and the receiving support 122 have been combined so that they are combined tightly. As shown in FIG. 4B, because of the tight buckling and the winding of the iron wires 13 in the respective side thereof such that the respective sides of the holding frame 12 and the elastic frame 11 are coupled to one another. Further, a clamping plane with elasticity formed by the orthogonal iron strip 124 and the spring 112 prevents the roasting object from dropping off during rotation of the barbecue grill 10, especially when the clamping plane is used with roasting objects of various thicknesses.

Figure 5A:
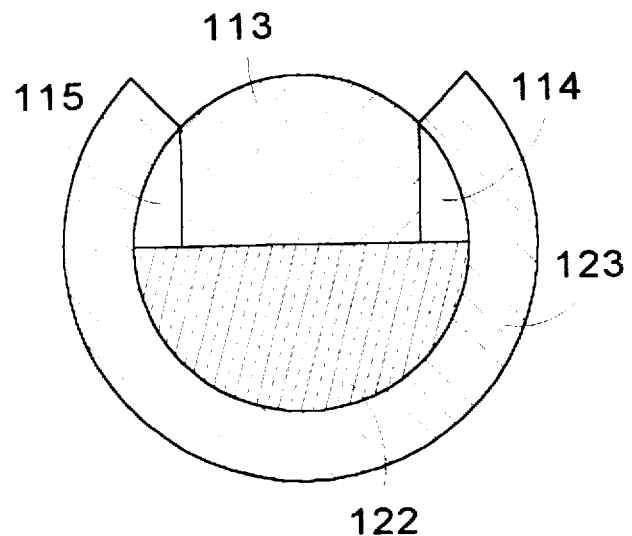
FIG. 5A is a cross-section view of the flexible buckle in an unlocked state.
Figure 5B:
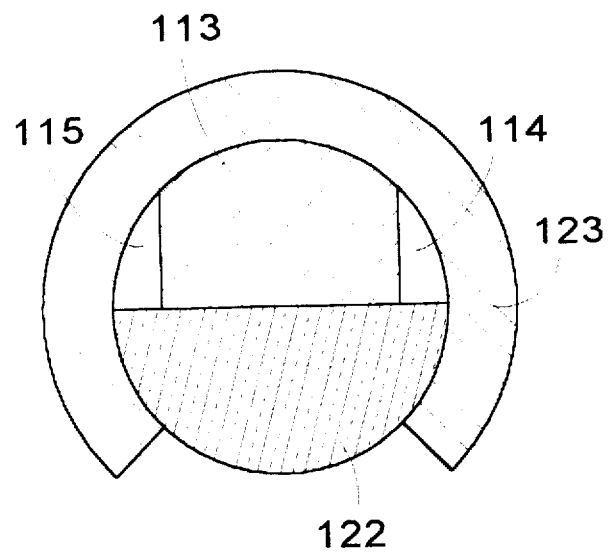
FIG. 5B is a cross-section view of a flexible buckle in a locked state, similar to FIG. 5A, and taken along the line B—B of FIG. 4.

FIGS. 5A and 5B show the unlocked and locked condition of the flexible buckle 123 along the line A—A of FIG. 4B. The flexible buckle 123 opens at an acute angle, and the inner diameter thereof is slightly smaller than that of the hemicylinder of the receiving support 122. As shown in Fig. 5A, the cuts 114 and 115 cause the handle to penetrate the opening of the flexible buckle 123 and then go into the inside of flexible buckle 123 so as to be confined with the receiving support 122. Further referring to FIG. 5B, the opening of the flexible buckle 123 may be rotated so that the opening is positioned on the side of the receiving support so as to tightly engage with the handle 112 and the receiving support 122. Referring to FIG. 1, an U-shaped notch 225 which is arranged similarly to support plate 21 is disposed on the support plate 22. Furthermore, the U-shaped notch 225 of the support plate 22 is provided after the barbecue grill 10 has been tightly buckled, the cylinder formed by handle 113 and the receiving support 122 may be rotated freely therebetween and can support the barbecue grill 10.

Figure 6A:
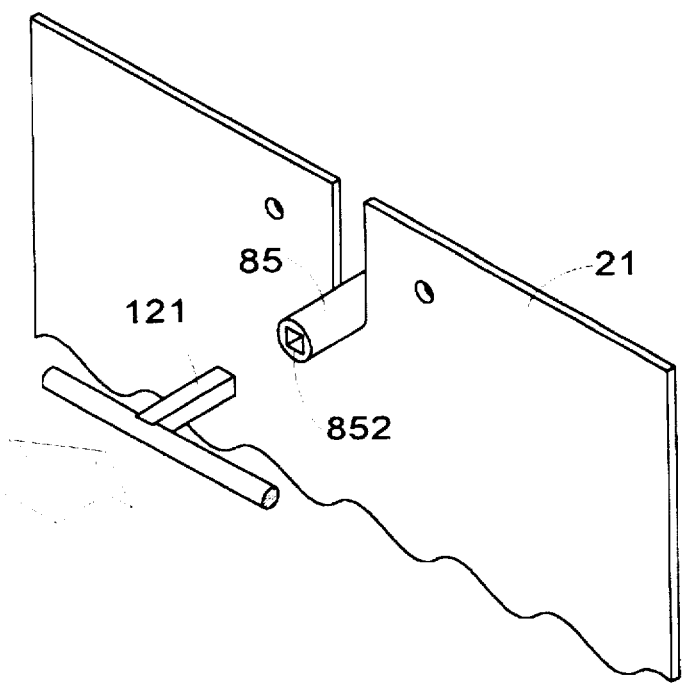
FIG. 6A is a perspective view of the tenon of a barbecue grill and a driving bush of the present invention before engaging.
Figure 6B:
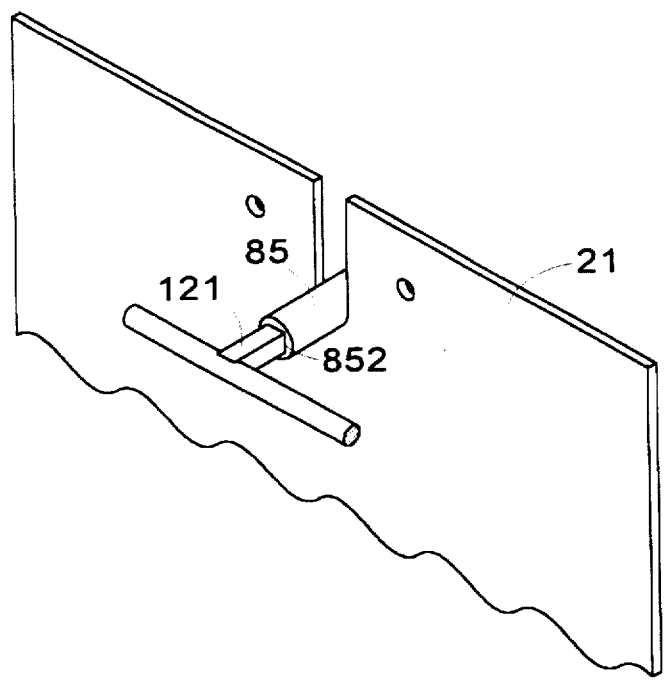
FIG. 6B is a perspective view of the tenon of a barbecue grill and a driving bush of the present invention after engagement.

FIGS. 6A and 6B show the perspective view of a square tenon 121 and a mortise 852 of the driving bushing 85 before and after joggling, respectively. As shown in the FIG. 6A, the square tenon 121 of barbecue grill 10 may be engaged with mortise 852 of the driving bushing 85 on the inside of the support plate 21 of the driving bushing 85 along the center line. As shown in FIG. 6B, the square tenon 121 is axially engaged with the mortise 852 so that as the driving bushing 85 is driven to rotate by the DC motor 3 1 to drive the barbecue grill 10 to rotate by said square joggle assembly, and during rotating the barbecue grill 10 will not drop off. Referring to FIG. I again, the longitudinal length of said furnace frame 20 will not affect the process that the axle connection of said barbecue grill 10 along the central line of the driving bushing 85, and after the barbecue grill 10 has been used, the rectangular tenon 121 may be axially separated from the mortise 852.

Figure 7:
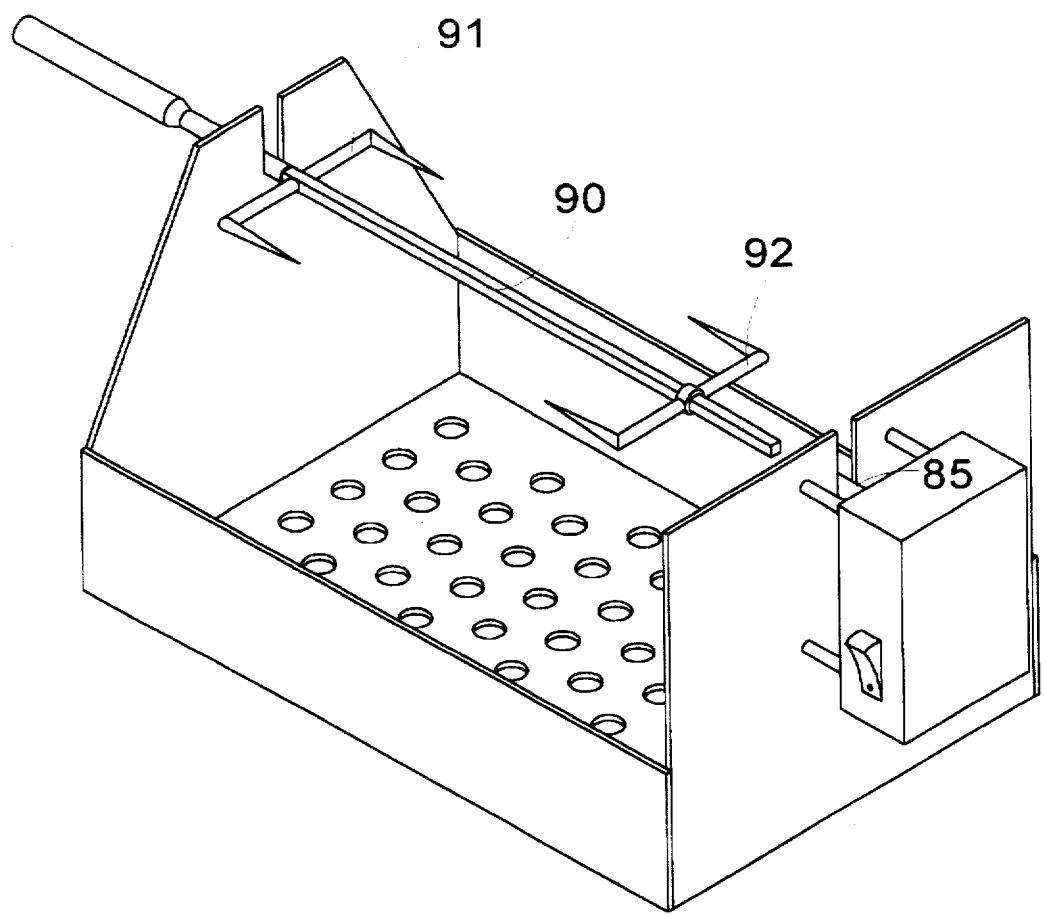
FIG. 7 is a perspective view of another embodiment of the present invention which shows a separated condition of a roasting bar and a driving bush.
Figure 8:
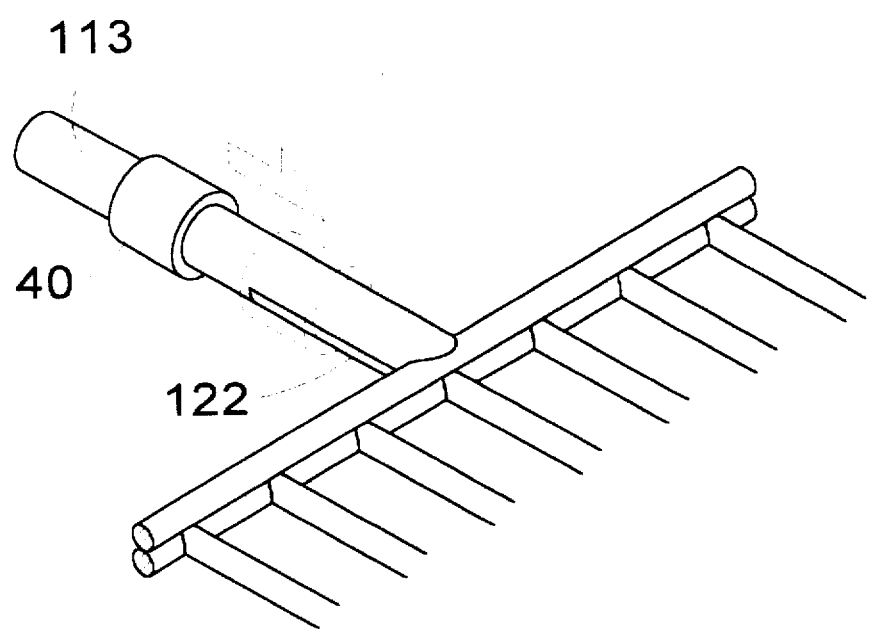
FIG. 8 is a partial perspective view of another embodiment of the present invention which shows the combination of a handle and a receiving support.
Figure 9:
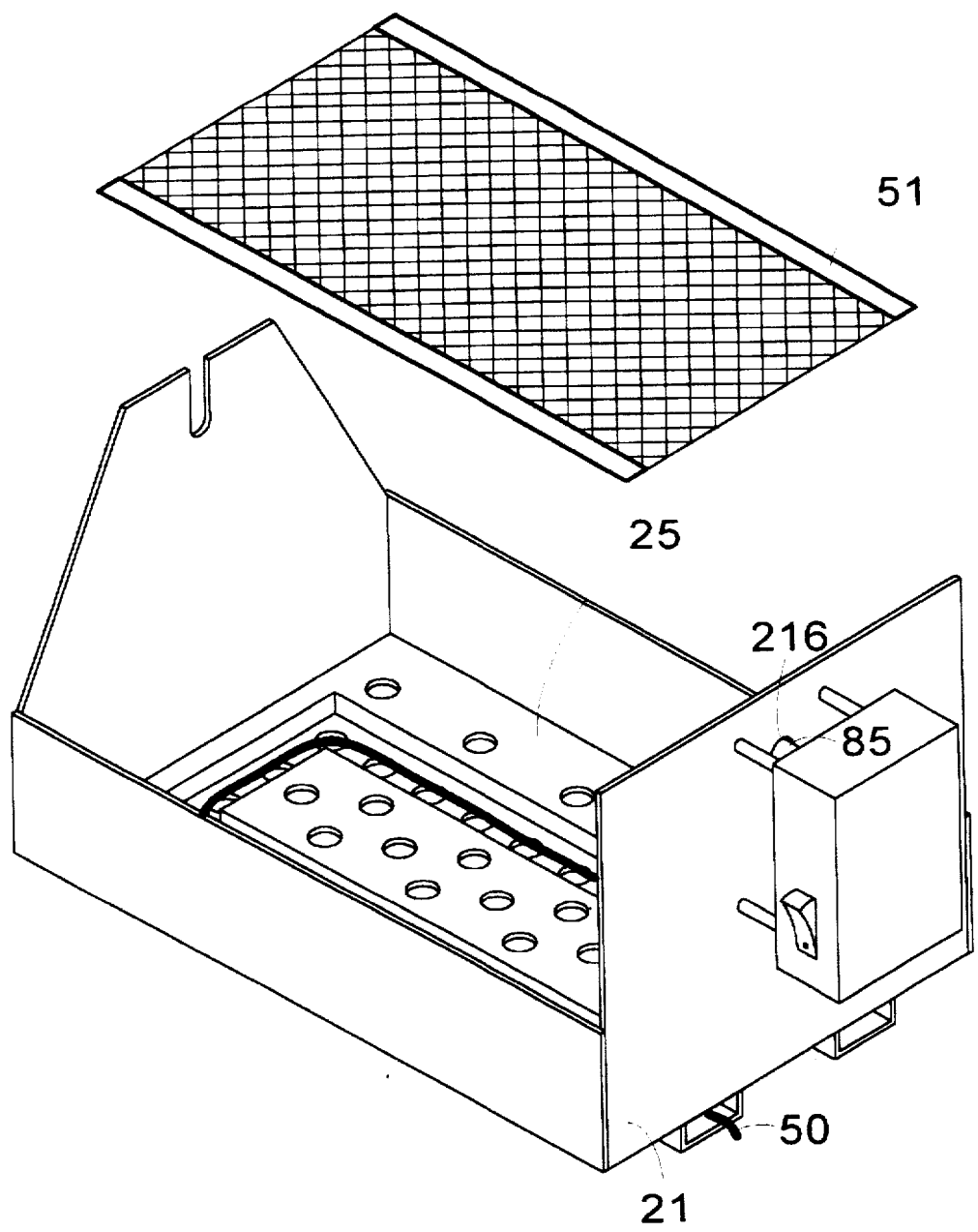
FIG. 9 is a perspective view of another embodiment of the present invention which shows a bottom plate and a support frame of the present invention.

While this invention has been described in detail with reference to its preferred embodiments, it should be appreciated that the present invention is not limited thereto. Rather, in view of the present disclosure, they would present themselves to those skilled in the art without departing from the scope and spirit of this invention. For example, another embodiment shown in FIG. 7 may employ a roasting bar 90 with a rectangular tenon to use the furnace frame 20 of the present invention to roast meat, chicken, etc.. Furthermore, the fork 91 is fixed on the roasting bar 90 and the fork 92 can manually engage therewith from the front end. FIG. 8 shows another embodiment of the handle 113 and the receiving support 122 of the present invention, the tube ring 40 nests the cylinder formed by handle 113 and receiving support 122 along the longitudinal direction of the handle 113. Additionally, as shown in FIG. 9, the U-shaped notch 215 may be replaced by an aperture 216 on the rectangular support plate 21, wherein the inner diameter of said aperture 216 is slightly larger than the outer diameter of said driving bushing 85, and is arranged so that the central line of the driving bushing 85 and the central line of the rotary axle of the DC motor are located on the same axle line. Moreover, the bottom plate of said furnace frame may have a rectangular channel shape slot for placing a leading line 50 which is scrolled around the bottom plate. Said leading line may be made as a fire source which may be fired about 15 to 20 minutes by firing the leading line 50 to generate a high temperature, and the upper side thereof may be covered with a web 51 for isolating the charcoal and the leading line. Additionally, the leg may be installed under the bottom of the furnace frame for increasing the height of the furnace frame so to enhance the capability of heat dissipation; and a plate for receiving ashes may be installed under the furnace frame. Therefore, it is appreciated that the present invention and said embodiments thereof may be performed together, and it is not limited by the preferred embodiment aforementioned.

What is claimed is:

1. A roasting device comprising:
  a) a furnace frame including a bottom plate, a pair of opposed lateral plates and a pair of opposed support plates, all of the plates collectively defining an open space for containing a fuel source disposed on the bottom plate;
  b) a driving source mounted on an exterior side of one support plate, the driving source including a driving bushing accessible from the open space; and,
  c) a barbecue grill including a holding frame and an elastic frame for securing an article to be roasted therebetween, the elastic frame further including a plurality of springs for applying an elastic clamping force to the article, the grill having a first portion supported on the other support plate and a second portion engaged with the driving bushing for rotating the grill within the open space by the driving source.

2. A roasting device comprising:
  a) a furnace frame including a bottom plate, a pair of opposed lateral plates and a pair of opposed support plates, all of the plates collectively defining an open space for containing fuel source disposed on the bottom plate, and the bottom plate further including a slot extending around the bottom plate for receiving a leading line of a fire source wound around said bottom plate;
  b) a driving source mounted on an exterior side of one support plate, the driving source including a driving bushing accessible from the open space; and,
  c) a barbecue grill including elastic means for securing an article to be roasted thereto, the grill including a first portion supported on the other support plate and a second portion engaged with the driving bushing for rotating the grill within the open space by the driving source.

* * * * *